(12) United States Patent
Dillehay et al.

(10) Patent No.: US 6,361,719 B1
(45) Date of Patent: Mar. 26, 2002

(54) METHOD FOR MANUFACTURING OF BLACK POWDER AND BLACK POWDER SUBSTITUTE

(75) Inventors: David R. Dillehay; David W. Turner, both of Marshall, TX (US); James A. Blackwell, Shreveport, LA (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/396,479

(22) Filed: Sep. 15, 1999

Related U.S. Application Data

(63) Continuation of application No. PCT/US98/03810, filed on Mar. 20, 1998.
(60) Provisional application No. 60/042,329, filed on Mar. 21, 1997.

(51) Int. Cl.$^7$ .......................... B29C 47/40; C06B 21/00; C06B 31/04
(52) U.S. Cl. ...................... 264/3.3; 264/3.4; 264/211.23
(58) Field of Search ...................... 264/3.3, 3.4, 211.23

(56) References Cited

U.S. PATENT DOCUMENTS

| 1,017,286 A | 2/1912 | Du Pont |
| 3,265,778 A | 8/1966 | Griffith |
| 3,552,259 A | 1/1971 | Griffith |
| 3,937,770 A | 2/1976 | Wiedemann et al. |
| 3,937,771 A | 2/1976 | Voigt, Jr. et al. |
| 3,980,741 A | 9/1976 | Lovold |
| 4,083,912 A | 4/1978 | Platte et al. |
| 4,275,967 A | 6/1981 | Erbach et al. |
| 4,570,540 A | 2/1986 | Bell |
| 4,931,229 A | 6/1990 | Krimmel et al. |
| 5,266,242 A | 11/1993 | Mogendorf et al. |
| 5,320,691 A | 6/1994 | Weber |
| 5,425,310 A | 6/1995 | Weber |
| 5,487,851 A | 1/1996 | Dillehay et al. |
| 5,565,150 A | 10/1996 | Dillehay et al. |
| 5,610,444 A | 3/1997 | Austruy et al. |
| 5,670,098 A | 9/1997 | Dillehay et al. |

FOREIGN PATENT DOCUMENTS

| DE | 28 25 567 B1 | 11/1979 |
| DE | 37 04 747 A1 | 7/1988 |
| GB | 1 601 392 | 10/1981 |
| WO | 94/08918 | 4/1994 |

*Primary Examiner*—Leo B. Tentoni
(74) *Attorney, Agent, or Firm*—Sullivan Law Group

(57) ABSTRACT

Processes are disclosed for making black powder and black powder substitutes without requiring binder-effective amounts of a binder and lacquers.

7 Claims, 3 Drawing Sheets

METHOD FOR MANUFACTURING OF BLACK POWDER AND BLACK POWDER SUBSTITUTE

RELATED APPLICATIONS

This is a national stage application under 35 U.S.C. 371 of PCT/US98/03810, filed Mar. 20, 1998 which claims the benefit of priority of U.S. provisional application No. 60/042,329 filed Mar. 21, 1997, the complete disclosure of which is incorporated herein by reference.

U.S. GOVERNMENT RIGHTS

The present invention was made with U.S. Government support under Contract No. DAAA21-94-D-0003 awarded by the Department of the Army to Thiokol Corporation. The United States Government has certain rights in this invention.

FIELD OF THE INVENTION

The present invention relates to a process for preparing explosive, propellant and pyrotechnic compositions, and generally black powder and black powder substitute. More specifically, the present invention relates to a process for preparing a black powder substitute in which an alkali metal nitrate, sulfur and at least one organic fuel are effectively combined in an extruder. The process preferably avoids lacquering and is preferably essentially binder-free.

DESCRIPTION OF PRIOR ART

Black powder is one of the oldest energetic materials known to mankind. Over the centuries, this energetic material has been used in industrial, entertainment, and military applications. During this time the fundamental formulation has not varied in substantial part. Historically, this low explosive composition has been composed of potassium nitrate or sodium nitrate, charcoal and sulfur. Despite the ready knowledge of the basic ingredients in its formulation, manufacture of black powder has remained more an art than science.

Slight differences in the ingredients lead to widely varying and unpredictable energetic performance. For instance, historically, problems have arisen resulting from slight change made in the production of charcoal slated for use in black powder manufacture. Charcoal is produced by carbonization of wood which is a natural product that has physical and chemical properties which are a function of tree species, soil composition, and other variables. Due to these and other variables, the properties of charcoal, such as its composition, ash content, pore structure, and density, will not be uniform during production, and that causes variable performance of black powder.

Efforts to avoid this and other problems include searches for substitutes for black powder. Among the proposed alternatives to carbon include specified crystalline organic compounds as disclosed in U.S. Statutory Invention Record No. H72 (Jun. 3, 1986), the complete disclosure of which is incorporated herein by reference. Although a diverse number of replacements have been proffered, none have proven to be a general substitute. Some proposed compositions exhibit satisfactory performance in limited special applications, whereas others lack the desired consistency in performance to fulfill requirements. Still others offer an apparent performance match in confined conditions, but burn poorly under less confined conditions.

Thus, in practice the presently known practiced batch process for making black powder is as shown, in part, in FIG. 1. It can be generally characterized by an essential first step which involves ball milling sulfur and charcoal to obtain an intimate mixture of the two ingredients. This first step is an essential one. Simple mixtures of the three known main constituents of black powder do not perform satisfactorily. A second step involves rod milling the potassium nitrate. The third step comprises the muller operation. The third step uses a unique muller design in which the muller is floated on bed of melted and solidified sulfur. The sides of the muller are wooden and the steel wheels of the muller weigh about 10 tons each. A materials charge comprised of potassium nitrate, sulfur, and charcoal is placed in the muller and a small but effective amount of water is added as a processing aid. The mixture is mulled until the consistency is visually determined to be correct. Mulling usually requires 4 to 5 hours. After mulling, the mulled material has a water content of about 3 percent. The a fourth step comprises shoveling the mulled mixture into a cart for transfer to the blocking building. The fifth step comprises block pressing the mulled mixture. The block press is a long wooden trough with aluminum plates spaced apart at intervals of about 4 inches. The block press is filled with the mulled mixture. A hydraulic press compresses the powder in the block press into black powder blocks about 1 inch thick and two feet square. A sixth step requires manually removing the black powder blocks and using a coarse toothed crusher to break the blocks into chunks for subsequent treatment in a corning mill. In,the seventh step the corning mill breaks the chunk into coarse particles which are then screened into various granulations. In a seventh step, most of the black powder is used to prepare 5000 pound batches of graphite glazed black powder in a rotating wooden barrel. The resultant finished product is typically packed 10 and packaging is generally in the form of 25 pound steel cans provided with a plastic liner and thereafter stored in magazines prior to shipment.

The presently practiced manufacturing process presents a number of drawbacks. The process is labor intensive and potentially dangerous due to the equipment being operated.

More recent attempts to develop alternative methods for making black powder and black powder substitutes are disclosed in Proceedings of the Eighteenth International Pyrotechnics Seminar, pages 925–938 (Jul. 13–18, 1992); U.S. Pat. Nosw. 5,320,691 and 5,425,310, the complete disclosures of which are incorporated herein by reference. In a disclosed method, potassium nitrate, sulfur and phenolphthalein are combined together with an alcoholic potassium hydroxide and water, mixed and alcohol evaporated off, granulated, dried-and collected. These methods have shown promise, but have not proven entirely satisfactory. Corrosion of mixing equipment and evolution of organic volatile materials during mixing are among the added difficulties with these methods.

Accordingly, a need for a less labor intensive and simpler process for making black powder and black powder substitutes remains unfulfilled.

SUMMARY AND OBJECTS OF THE INVENTION

The present process avoids organic volatiles while preparing an intimate mixture of the essential ingredients of black powder or, in particular, a black powder substitute.

The present process is less labor intensive than the presently commercially practiced process for the preparation of black powder and substitutes.

The present process can be remote operated and/or monitored.

The present process avoids, if not at least substantially reduces, the corrosion problem noted with some proposed alternatives to the present commercial process.

The present process can be practiced on a continuous basis.

These and other objects are achieved by the present invention.

According to the present invention, a black powder substitute is obtainable by preparing a salt of a multi-ring organic compound as a substitute for charcoal, preparing an intimate admixture of the thus produced salt and sulfur within a targeted weight (or molar) ratio of these ingredients, particulating the oxidizer sufficiently to permit its blending with the salt and sulfur, extruding these ingredients in the presence of water (up to about 10 weight percent) and a small but, effective amount of slickening agent, e.g., water soluble polymer, preparing tan extrudate of pre-selectable geometry, cutting the extrudate to a desired size and configuration, optionally drying the cut extrudate, optionally subjecting the cut extrudate to a rounding treatment, and packaging and storing the cut extrudate for subsequent use or shipment. The extrusion step can be characterized as being conducted essentially free of alcohol, and specifically at least essentially free of an alcoholic potassium hydroxide solution. As a consequence, when conducted the extrusion step is in general essentially free of VOC emissions. In the present process, different agents and additives can, if desired, be introduced, such as agents for reducing the electrostatic sensitivity (ESD) at different steps.

DETAILED DESCRIPTION OF THE INVENTION

Figure 1:
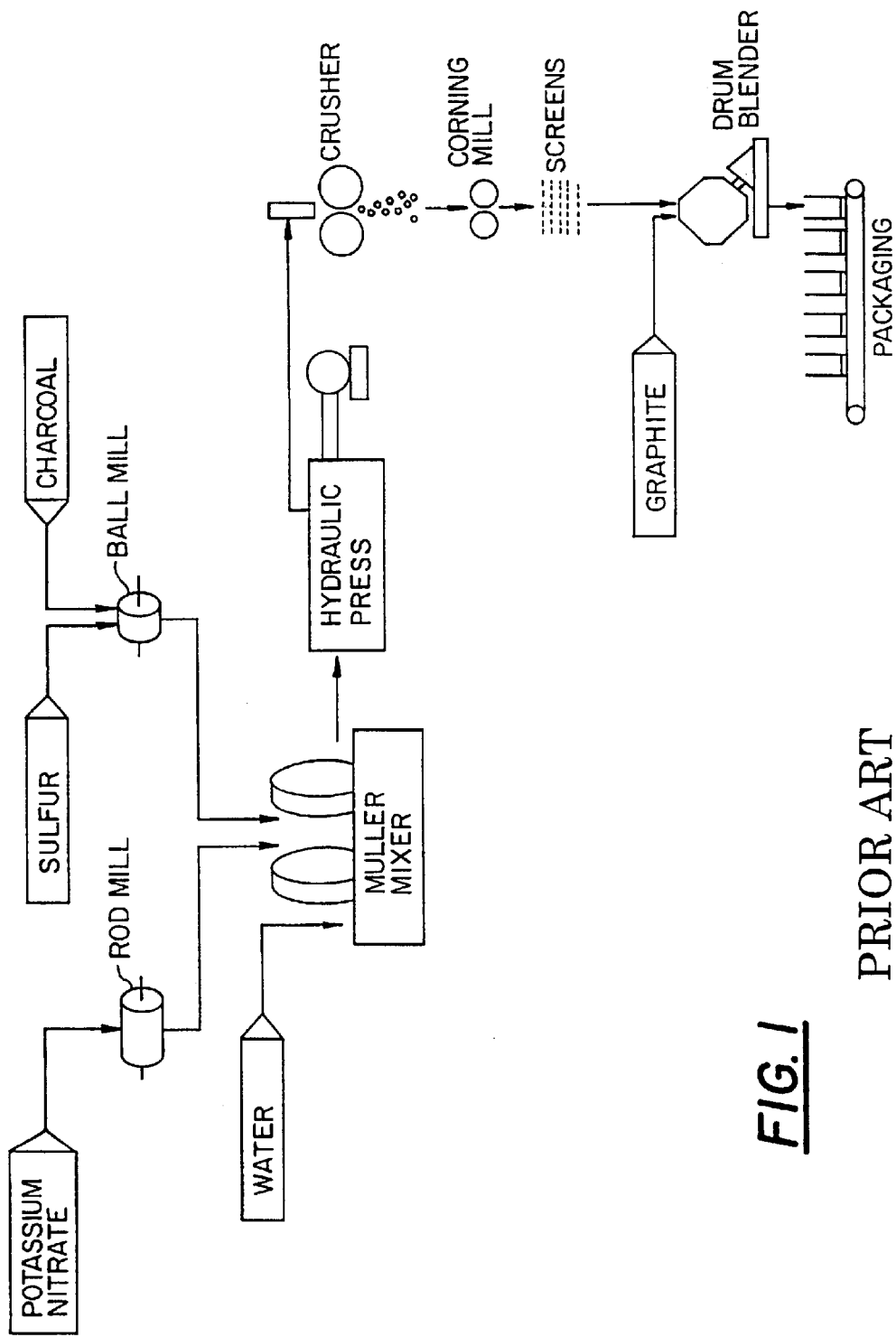
FIG. 1 is flow diagram of a basic conventional process for making black powder.

According to the present process, the oxidizer is first ground to a desired particle size. Equipment suitable for achieving the desired particle size includes, by present preference, a rod mill. Since black-powder and black powder substitutes can exhibit an undesired electrostatic sensitivity ("ESD") sensitivity, this milling step can also be used to introduce one or more ingredients in an amount effective to reduce the ESD sensitivity of the final ultimate products. Suitable such ingredients include, among others, graphite and carbon fibrils.

In our black powder and charcoal-free black powder substitutes the oxidizer comprises at least one metal-containing oxidizer, such as an alkali metal nitrate, such as sodium or potassium nitrate, with the latter being preferred. Potassium nitrate Class C Mil. Spec. MIL-P 156B or equivalent is an example.

In General, the fuel and sulfur are intimately mixed together. In the presently preferred method, sulfur and fuel (charcoal or non-charcoal organic fuel) are milled together, such as in a ball mill, to break up any agglomerates and simultaneously reduce the particle size of the fuel (charcoal or non-charcoal organic fuel) while thoroughly mixing these ingredients. The milled product is capable of being used in loss-in-weight feeding operation in an embodiment of the present process.

Sulfur includes ground sulfur, Grade C Mil. Spec. MIL-S-487B or equivalent.

The fuel in the present invention is generally characterized as charcoal or an organic fuel, e.g., multi-ring compound. As will be recognized, different grades of charcoal can be used. For instance, suitable charcoal include charcoal Grade A or charcoal Grade D, which can be used singly or in combinations. Organic multi-ring compounds having a low hydrogen to carbon ratio and reactable hydroxy groups (or carboxyl groups) capable of being converted to a metal salt. Organic multi-ring compounds are generally used in the form of at least one metal salt, preferably a water-soluble salt, such as an alkali metal salt, e.g., a potassium salt, of phenolphthalein. Potassium salts are preferred over sodium salts. Salts of phenolphthalein are disclosed in Turner, et al., Proceedings of the Twentieth International Pyrotechnics Seminar, 1093–1108 (1994), U.S. Pat. No. 5,312,691 and in U.S. Pat. No. 5,425,310, the complete disclosures of which are incorporated herein by reference. It should be noted that unlike prior processes, the present process does not involve preparing any salt of phenolphthalein in situ during extrusion. The prior art processes involving in situ preparation of salts of phenolphthalein during the mixing (blending) step are difficult to control, can lead to corroded mixing equipment, and are incompatible with the preferred water soluble binders contemplated herein. In principle, it is possible to use one or more of organic multi-ring compounds, such as an alkali metal salt of a suitable dye or phenolphthalein, with charcoal as the fuel to yield a hybrid black powder.

In practice, the pre-prepared alkali metal salt of phenolphthalein can include unreacted or partially reacted phenolphthalein. The mixture can generally be characterized by the molar ratio between the phenolphthalein and alkali metal hydroxide (e.g. potassium hydroxide). In theory the ratio can be 1:3 to about 1:0.175, but in practice the phenolphthalein-:potassium ratio can be in the range of about 0.4 to about 1.75 with a more preferred ratio in the range of about 1:0.6 to about 1:1.25. Good energy output was observed for a final product of the present invention when the ratio was 1:0.87 as measured in a closed bomb test.

The sized oxidizer is preferably loaded into at least one loss-in-weight feed hopper.

The mixture of sulfur and fuel is preferably loaded into at least one other loss-in-weight feed hopper.

Suitable loss-in-weight feed hoppers are available to those skilled in the art and are not a critical design element.

The oxidizer and the fuel/sulfur mixture are introduced, e.g. fed from the hoppers, into a suitable extruder. Extruders, including twin screw extruders, are generally described in Encyclopedia of Polymer Science and Engineering, Volume 6, pages 571–631 (2nd Ed. 1986) and Martelli, Twin Screw Extruders, van Nostrand Reinhold, New York (1983) the complete disclosures of which are incorporated by reference. Twin screw extruders are preferred, and particularly preferred is a split barrel twin screw extruder which is designed to split open and vent the contents if the pressure build-up during extrusion exceeds a pre-designed maximum pressure. According to a preferred mode, a twin screw extruder, preferably a split twin screw extruder, can be used to produce an intimate, sufficiently homogenous blend, e.g. mixture, of the main ingredients of black powder or a black powder substitute, to yield an extrudate of relatively controllable density, e.g., a relatively tailorable densification, and which is capable of being granulated to obtain the desired particulated product.

The relative ratios of the essential feed materials for extrusion are selected and can be monitored during the feeding process. As used herein the term essential feed materials connotes the oxidizer, fuel (charcoal or charcoal replacement) and sulfur. Generally, in one embodiment, the relative amounts of essential feed materials are selected so that the oxidizer is present in an amount of about 73.5±1–2 percent by weight, sulfur is present in an amount of 10.0 ± percent by height, and the fuel (charcoal replacement for black powder substitutes) constitutes the remainder for 100% of essential feed materials (exclusive of additives and binder).

The selected amount of water is then added to the extruder using kneading blocks and/or other apparatus as required to obtain a water containing mixture which can have a pastel-like consistency, provided that the amount of water is such that an extrudate which can be produced is capable of retaining its shape is obtainable and the material in the extruder is capable of being extruded. Too much water added to the extruder results in a runny material which is not capable of being satisfactorily extruded. The water-containing mixture contains water in an amount to avoid locking up the extruder, and in general water is added in an amount of up to about 10 weight percent of water. By preference, water is added such that the mixture contains at least about 8 weight percent water.

The relative consistency, e.g. water content, of the extruded product is a factor in determining the density of shaped extrudate. Thus, once the black powder or the black powder substitute ingredients are selected, controlling the water addition during extrusion is an effective means to control to some extent the density of extrudate.

In general, the water should be added to the extruder at a point very close to the point where the solids are being introduced to provide a desensitizing effect on the mixture in the extruder. The kneading blocks can put considerable work into the mixing and the water can densitize the mixture. The water can also function to reduce the opportunity for segregation of the powders. In principle, the water addition can be-made in part early in the extrusion process, such as into a first extrusion zone, and a selected portion of the water addition can be made later in the extrusion process, such as into a second extrusion zone and/or at the beginning of a third extrusion zone.

A slickening agent is preferably added during the extrusion step. The slickening agent provides some lubricity to the material being extruded; and is not a lacquering agent, i.e., the present process is no a lacquer-based process. By preference, the slickening agent is a water soluble polymer, and more preferably the water soluble polymer is at least essentially free of organic solvents, if not organic solvent free. The slickening agent, such as the water soluble polymer, is preferably added in a small but effective amount to enable the other ingredients to be readily extruded. The water soluble polymer can be added in varying amounts, but is preferably added in a relatively small but effective amount for facilitating the flow of materials through the extruder. In general, one or more water soluble polymer can be present in an amount of up to about 2.0% by weight, but preferably in an amount less than about 1% by weight. Water soluble polymer suitable for use herein include gums, such as, for example, guar gum. A detailed discussion of gums is provided by C. L. Mantell, *The Water-Soluble Gums*, Reinhold Publishing Corp., 1947, the complete disclosure of which is incorporated herein by reference. In principle a small but effective amount of water soluble surfactant may be used as well.

The slickening agent is preferably added early in the extrusion step such as near the-point at which the solid materials, such as fuel and oxidizer, are being introduced into the-extruder. This will enable the slickening agent to be homogeneously dispersed in the materials being extruded.

The twin screw extruder is equipped with dies. In one embodiment, the-extrudate exits through the dies in stick shapes, although other shapes are suitably prepared by selecting the appropriate die. The sticks can, for instance, be flat ribbon shaped or substantially cylindrically shaped with a pre-determined cross-sectional diameter. The extrudate can also be ring-shaped, e.g. a hollow strand, or can be spherodized in a manner known to those skilled in the art The extrudate can be cut, chopped etc. to obtain products of known size. For instance, the extrudate, e.g. a stick, is fed to a cutting device, such as a face cutter, whereby the stick is chopped to suitable lengths. In one embodiment, the length/diameter (L/D) ratio is about 1:1 because, in principle, the flow properties of the lengthed (cut) product with a L/D ratio of 1:1 are relatively predictable. The variation in the L/D results in product variation, such as by analogy to the different classes (particle sizes) of conventional black powder. The seven particles sizes (classes) of conventional black powder are described in the AMCP-187 Pamphlet, including the cross-referenced MIL-223-P, the complete disclosure of which is incorporated herein by reference.

The thus formed particles are collected and dried. The drying can be performed on a continuous or batch basis, such as in a continuous plate drier or batch oven, respectively.

The dried particles can, if desired, be subjected to a rounding treatment. In this treatment the particles are dry tumbled together whereby rough edges can be rounded off. Graphite and/or another ESD controlling agent can be added to the tumbler. In principle the time of addition of an ESD controlling agent is not critical. It can be added to the tumble prior to or concurrently with the dried particles. Or, if desired, the ESD controlling agent can be added during the tumbling step. The point and mode of addition is generally limited only by the criterion of having at least a substantially uniform distribution of the ESD controlling agent through the tumbled particles. By preference the tumbled particles are coated with the ESD controlling agent.

The particles preferably retain some moisture, and a typical range is on the order of about 1 to 3% by weight.

The particles can thereafter be packaged for storage and shipment.

The extruder can first be equipped with a die transition block on the end of the barrel, and a die plate with die inserts installed. The loss-in-weight feeders are loaded with their respective materials. For safety reasons, the extrusion can be conducted in facility with interlocking and closable fire doors.

In operation the present process can be conducted from a remote location. For instance, for remote operations, closed circuit video feed, e.g. closed circuit television, can be monitored from a control room. Extrusion conditions such as pressure, die block temperature, torque, screw speed, and the like are readily controlled through computerized equipment, such as, for instance, an Allen-Bradley PLC-5 programmable controller. The material feeders, e.g. loss-in-weight feeders, are also monitored so that, for instance, the materials are fed into the extruder at the targeted weight ratios within the specified deviations. Feeders can be alarmed so that if the feed falls outside the targeted ratios, an alarm will indicate, out of specification feeding to the controller and the operator. The water is present in the extrusion to prevent locking up the extruder. Therefore, if the liquid feed fails, the system is preferably designed to shut down the solids feed from the loss-in-weight feeders. If solids for feeding through any or all of the loss-in-weight feeders is exhausted, the feeders can be rigged with an alarm to alert the controller. Solids feed failure-is less deleterious than liquid feed failure, but does adversely affect the quality of the final product. However, in operation the operator may have only a few minutes to react to a loss of solids alarm before extrudate exits the extruder. The aforementioned process conditions and related control data can be visually presented by a display panel with commercially available CRT displays, such as an Allen-Bradley Control View display, to enable the controller (operator) to monitor remotely the operation and process conditions.

Figure 2:
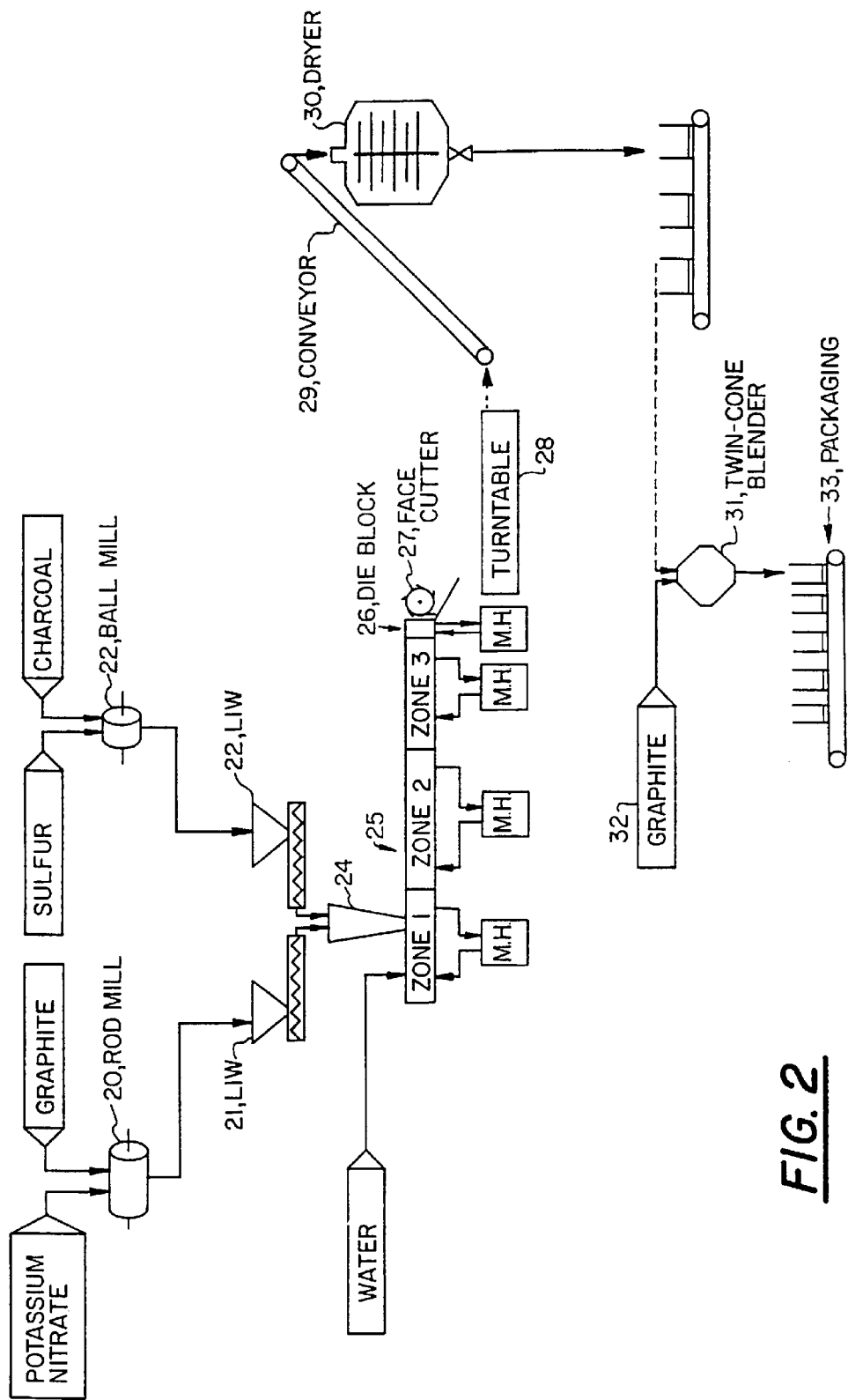
FIG. 2 is a diagram of an embodiment of the present invention in which a split twin screw extruder is being used to prepare a black powder.

FIG. 2 depicts preparing a method for making black powder in which the potassium nitrate and, optionally, graphite are introduced into a rod mill 20. Rod milling is the preferred method of choice for particle size reduction of the potassium nitrate. The rod milled product is introduced into a loss-in-weight feeder 21. Sulfur and charcoal are combined and mixed in a ball mill 22. Ball milling can break up any agglomerates and simultaneously reduce the particle size of the charcoal whereby a thoroughly mixed combination suitable for loss-in-weight feeding is obtained. The ball milled product is introduced into another loss-in-weight feeder 23. The feeders 21 and 23 feed their respective products through a common hopper 24 into twin extruder 25. Water is added to the extruder in zone 1. The split twin screw extruder 25 shown has a zone 1, zone 2 and a zone 3. The slickening agent, such as guar gum, should, in general, be added near the first feed port to the extruder, and thus preferably in the first extrusion zone in split twin screw extruder 25. The guar gum can be added via its own feeder (not shown) or be pre-blended with the fuel/sulfur mixture and added via the feeder for the latter. The split twin screw extruder 25 has a die block 26 and a face cutter 27. The extrudate forced through die block 26 is face cut and fed to turntable 28 which deposits the face cut extrudate on a conveyor 29 for transport to a dryer 30. A suitable dryer is available from Kraus Maffei. Drying removes most of the water to leave a product which can contain up to 3 percent by weight water. The dried product is conveyed to a twin cone blender 31 to which can be added, if desired, an ESD control agent, such as graphite 32, after which the blended product is packaged 33.

Figure 3:
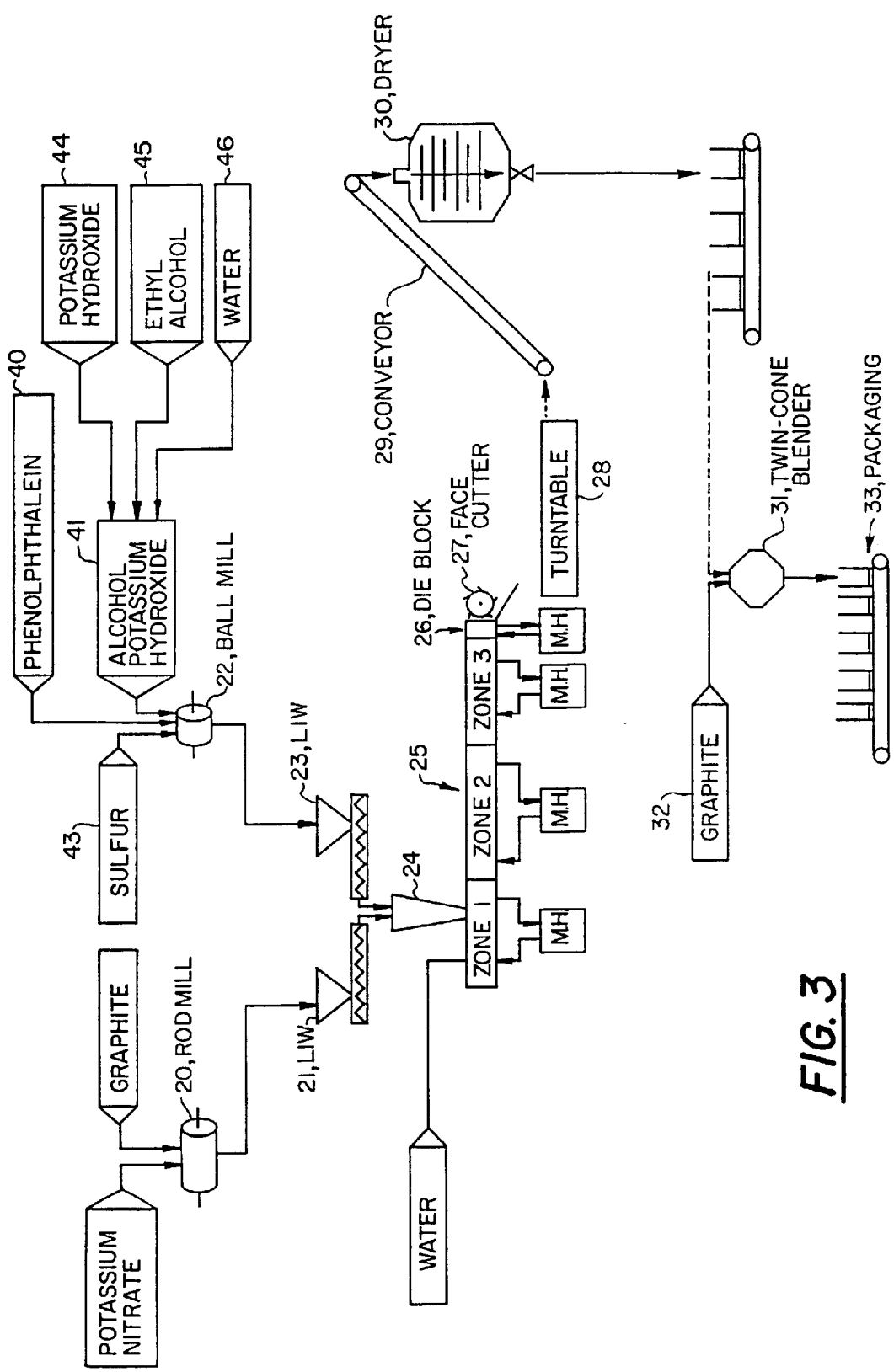
FIG. 3 is a diagram of an embodiment of the present invention in which a split twin screw extruder is being used to prepare a black powder substitute.

FIG. 3 shows an embodiment of the present invention for preparing a black powder substitute. The method depicted in FIG. 3 is similar to one for preparing black powder as shown in FIG. 2. Like numerals in FIG. 3 designate like apparatus and steps depicted in FIG. 2. In FIG. 3, charcoal is not combined with sulfur. Phenolphthalein 40 is combined with alcoholic potassium hydroxide 41, and that combination can be ball milled 24 with sulfur 43. The alcoholic potassium hydroxide is prepared from ingredients 44, 45 and 46. The alcohol can be removed prior to adding the balled milled product to the split twin screw extruder 25. The slickening agent, e.g. a water soluble binder, can be added to zone 1 or another zone in the split twin screw extruder 25 provided that the slickening agent, e.g. water soluble binder, is at least substantially homogeneously dispersed in the material being extruded prior to the extrudate exiting the die block 26.

The material being extruded will have a residence time sufficient to enable dispersion of all the materials fed into the extruder, such as a split twin screw extruder 25 as in FIGS. 2 and 3, so as to yield a homogenous extrudate. In general, residence time in the extruder can be on the order of minutes, such as about 2 minutes. In the extrusion conducted using the split twin screw extruder 25 depicted in FIGS. 2 and 3, the extrusion is preferably run at ambient (room) temperatures, although some higher temperatures can be used to facilitate dispersions/dissolution of a slickening agent such as a gum, for instance guar gum. In principle temperatures in zones 1, 2 and 3 of the split win screw extruder 25 can be in a range of about 20° C. to about 75° C., and more particularly from about 25° C. to 70° C. The actual temperature profile can be dictated by the choice of materials being added to the extruder.

The die block shown in FIGS. 2 and 3 can, if desired, be separately temperature controlled in which case the extrusion step can be deemed to have a fourth zone. It is to be expected that the materials being extruded through the die can generate frictional heating. Therefore, the die block can be provided with means for cooling (not shown) to keep the temperature of the extrudate within a desired range. In addition to or as an alternative, the zone 3 of the split twin screw extruder 25 can be cooled.

What we claim is:

1. A process for making black powder which comprises:
   (a) rod milling selected amounts of at least one alkali metal nitrate graphite;
   (b) ball milling selected amounts of sulfur and charcoal;
   (c) introducing the rod-milled product from step (a) and the ball-milled product from step (b) into a first zone of an at least three zone twin screw extruder and introducing a selected amount of water to said first zone, and extruding these materials in said twin screw extruder; and
   (d) recovering the extrudate from the extruder,
   wherein said process is conducted essentially in the absence of binder-effective amounts of a binder and lacquer.

2. The process according to claim 1, wherein said alkali metal is potassium nitrate.

3. The process according to claim 1, wherein a small but effective amount of at least one slickening agent is introduced in at least one of step (c).

4. A process for preparing a charcoal-free black powder substitute which comprises
   (a) rod milling a selected amount of at least one alkali metal nitrate and graphite;
   (b) ball milling a selected amount of sulfur with a selected amount of phenolphthalein and/or an alkali salt thereof, and a selected amount of alcoholic potassium hydroxide;
   (c) introducing the products of steps (a) and (b) into a first zone of an at least three-zone extruder, and introducing a selected quantity of water to said first zone;
   (d) extruding the product formed in step (c) to obtain an extrudate; and
   (e) recovering-the extrudate from step (d), wherein said process is conducted essentially in the absence of binder-effective amounts of a binder and lacquer.

5. The process according to claim 4, wherein a small but effective amount of at least one slickening agent is introduced in at least one of step (c) or step (d).

6. The process according to claim 4, wherein said at least one slickening agent is at least essentially organic-solvent-free.

7. The process according to claim 1 or 3, wherein said twin screw extruder is a split twin screw extruder.

* * * * *

UNITED STATES PATENT AND TRADEMARK OFFICE
CERTIFICATE OF CORRECTION

PATENT NO.    : 6,361,719 B1                                              Page 1 of 1
DATED         : March 26, 2002
INVENTOR(S)   : David R. Dillehay, David W. Turner and James A. Blackwell It is certified that error appears in the above-identified patent and that said Letters Patent is hereby corrected as shown below:

<u>Column 8,</u>
Line 13, after "powder" insert -- , --; change "which comprises: to -- the process comprising: --;
Line 15, after "nitrate" insert -- and --; and
Line 23, after "the" (first occurrence) insert -- black powder as --.
Line 27, after "metal" insert -- nitrate --.
Line 30, delete "at least one of".
Line 32, after "substitute" insert -- , --; change "which comprises "to -- said process comprising: --;
Line 42, after "obtain" insert -- the charcoal-free black powder in the form of --.
Line 50, change "4" to -- 5 --.

Signed and Sealed this

Twenty-third Day of July, 2002

Attest:

Attesting Officer

JAMES E. ROGAN
*Director of the United States Patent and Trademark Office*